US009152700B2

(12) United States Patent
Duerig et al.

(10) Patent No.: US 9,152,700 B2
(45) Date of Patent: Oct. 6, 2015

(54) APPLYING QUERY BASED IMAGE RELEVANCE MODELS

(75) Inventors: Thomas J. Duerig, Sunnyvale, CA (US); Charles J. Rosenberg, Cupertino, CA (US); Kunlong Gu, Belmont, CA (US); Samy Bengio, Mountain View, CA (US); Yun Zhou, San Jose, CA (US)

(73) Assignee: Google Inc., Mountain View, CA (US)

( * ) Notice: Subject to any disclaimer, the term of this patent is extended or adjusted under 35 U.S.C. 154(b) by 261 days.

(21) Appl. No.: 13/350,143

(22) Filed: Jan. 13, 2012

(65) Prior Publication Data

US 2015/0169738 A1  Jun. 18, 2015

Related U.S. Application Data

(60) Provisional application No. 61/541,543, filed on Sep. 30, 2011.

(51) Int. Cl.
*G06F 7/00* (2006.01)
*G06F 17/30* (2006.01)
*G06K 9/62* (2006.01)
*G06K 9/66* (2006.01)
*G06K 9/52* (2006.01)

(52) U.S. Cl.
CPC ...... *G06F 17/30675* (2013.01); *G06F 17/3028* (2013.01); *G06K 9/52* (2013.01); *G06K 9/6202* (2013.01); *G06K 9/6256* (2013.01); *G06K 9/6262* (2013.01); *G06K 9/6296* (2013.01); *G06K 9/66* (2013.01)

(58) Field of Classification Search
CPC ............. G06F 17/30265; G06F 17/30256; G06F 17/30864; G06F 17/30321
See application file for complete search history.

(56) References Cited

U.S. PATENT DOCUMENTS

| 8,429,173 | B1 * | 4/2013 | Rosenberg et al. | 707/748 |
|---|---|---|---|---|
| 8,498,974 | B1 * | 7/2013 | Kim et al. | 707/706 |
| 8,515,212 | B1 * | 8/2013 | Bengio et al. | 382/305 |
| 2004/0267740 | A1 * | 12/2004 | Liu et al. | 707/3 |
| 2008/0097981 | A1 | 4/2008 | Williams et al. | |
| 2009/0144263 | A1 * | 6/2009 | Brady | 707/5 |
| 2012/0226687 | A1 * | 9/2012 | Xu et al. | 707/728 |

* cited by examiner

*Primary Examiner* — Tony Mahmoudi
*Assistant Examiner* — Michael Le
(74) *Attorney, Agent, or Firm* — Fish & Richardson P.C.

(57) ABSTRACT

A method includes receiving a search query comprising one or more query terms, receiving image relevance models that each generate relevance measures of content feature values of images to a query, each image relevance model being a predictive model that has been trained based on content feature values of a set of training images, and each of the queries being a unique set of one or more query terms received by a search system as a query input, identifying an image relevance model for a different query that has been identified as similar to the received search query, and calculating a fractional adjustment multiplier for search results responsive to the received search query, the fractional adjustment multiplier being based on a relevance measure generated by the identified image relevance model for the different query and based on a degree of similarity between the different query and the received search query.

18 Claims, 4 Drawing Sheets

APPLYING QUERY BASED IMAGE RELEVANCE MODELS

This application claims the benefit of the priority of U.S. provisional patent application 61/541,543, filed on Sep. 30, 2011, which is incorporated here in its entirety by reference.

BACKGROUND

This specification relates to data processing and applying image relevance models.

An image search apparatus can use an image relevance model to evaluate relevance between textual user queries and images. For example, the relevance of an image to a user query can be determined, in part, based on textual content depicted in the image or textual content associated with the image, e.g., textual content appearing on a web page in association with the image. The image relevance model can be further improved by analyzing the way in which users who submit user queries interact with images responsive to the user queries. For example, an image search system may respond to a user query with one or more images, which are then displayed on a user device. If the user clicks on or otherwise interacts with one or more images, then the image relevance model can sometimes infer that those images were good (relevant) responses to the user query. If a particular image satisfies an image relevance threshold, e.g., a certain number of users click on the image when the image is presented as responsive to a user query, then the image relevance model may label the image with a reference to the user query, e.g., a term included in the query, based on the determination that the user query accurately describes the image.

Further, the image relevance model can be used to identify visual features of multiple images that have been identified as relevant to the same query. For example, multiple images that have been identified as relevant to the same query may have similar visual features, such as similar colors, brightness, shapes, edge locations, and/or other similar attributes. For example, images associated with the query "sunrise" will likely share similar colors (of a sky at sunrise) and shapes (of a sun appearing on the horizon). The attributes identified by the image relevance model can be used to further identify other images sharing the same common features that may also be relevant to a query.

SUMMARY

In general, one aspect of the subject matter described in this specification can be implemented in methods that include receiving a search query comprising one or more query terms, receiving image relevance models that each generate relevance measures of content feature values of images to a query, each image relevance model being a predictive model that has been trained based on content feature values of a set of training images, and each of the queries being a unique set of one or more query terms received by a search system as a query input, identifying an image relevance model for a different query that has been identified as similar to the received search query, and calculating a fractional adjustment multiplier for search results responsive to the received search query, the fractional adjustment multiplier being based on a relevance measure generated by the identified image relevance model for the different query and based on a degree of similarity between the different query and the received search query. This and other embodiments of this aspect include corresponding systems, apparatus, and computer program products.

Implementations of this aspect may include one or more of the following features. The degree of similarity between the different query of the identified image relevance model and the received search query can be determined based a similarity metric applicable to queries. The similarity metric includes a measure of similarity of query terms in the received search query and query terms of the different query that has been identified as similar to the received search query. Calculating a fractional adjustment multiplier includes calculating an adjustment multiplier based on the relevance measure generated by the identified image relevance model, and applying a divisor to the adjustment multiplier, the divisor being determined based on the degree of similarity between the different query of the identified image relevance model and the received search query. The identified image relevance model for the different query can be applied to a resource referenced by the search results to generate the relevance measure. The fractional adjustment multiplier can be applied to an information retrieval score associated with a resource referenced by the search results.

Particular embodiments of the subject matter described in this specification can be implemented so as to realize one or more of the following advantages. An image relevance model for one query can be applied to a similar query. Values used to order search results can be calculated if an image relevance model is not available for a query to which the search results are responsive.

The details of one or more embodiments are set forth in the accompanying drawings and the description below. Other features, aspects, and advantages of the invention will be apparent from the description and drawings, and from the claims.

DESCRIPTION OF DRAWINGS

Like reference symbols in the various drawings indicate like elements.

DETAILED DESCRIPTION

A trained image relevance model can be used to assign image relevance scores to images that quantify the relevance of the images to a query. For example, when an image is determined to be responsive to a query, the image relevance score can be used to "boost" the image in the search results. Images returned in search results for a query can be ordered according to an "information retrieval" (IR) score which indicates the degree to which the image is responsive to the query. The image search apparatus can have defined thresholds for image relevance scores, and if an image relevance score for a particular image exceeds a threshold for a query, the IR score can be multiplied by a "boost" corresponding to the image relevance score threshold.

This technique can be applied to queries which may be similar to, but not exactly the same as, queries that were used to train the image relevance model. For example, the image relevance model may have been trained for the query "Empire State Building" and a particular image of the building may have a high image relevance score, e.g., above a defined image relevance score threshold. When the image appears in search results for the "Empire State Building" query then the image is given a boost multiplier to its IR score that places it high in the search results. The image search apparatus can also recognize that the image is likely to be relevant to a similar query, for example, "Empire State Tower." The image search apparatus can thus apply a boost multiplier for this similar query just as the image search apparatus did for the query with which it was trained ("Empire State Building"). Because the similar query is not exactly the same as the original query, the boost multiplier for the similar query can be a fraction of the boost multiplier applied for the original query, boosting the same image to a lesser degree than the image is boosted for the original query.

Figure 1:
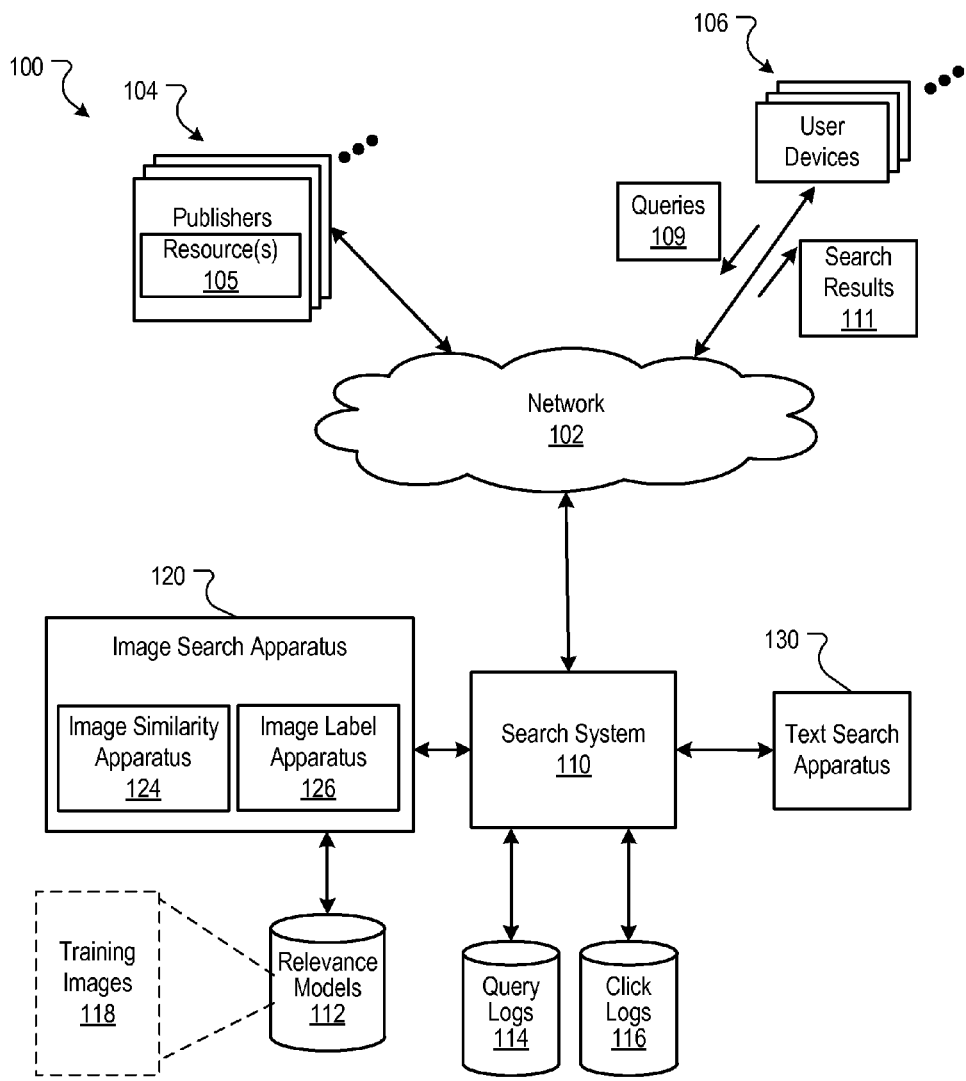
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, which connects web sites 104, user devices 106, and the search system 110. The environment 100 may include many web sites 104 and user devices 106, which are also sometimes referred to as client devices.

A web site 104 is a facility containing one or more resources associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. The resources can include content, e.g., words, phrases, images and sounds and may include embedded information, e.g., meta information and hyperlinks, and/or embedded instructions, e.g., scripts.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources, the search system 110 identifies the resources by crawling and indexing the resources 105 provided by the web sites 104. Data about the resources can be indexed based on the resource to which the data corresponds.

The user devices 106 submit search queries 109 to the search system 110. In response, the search system 110 identifies resources that are responsive to, e.g., have at least a threshold relevance score for, the search query 109. The search system 110 generates search results 111 that identify the resources and returns the search results 111 to the user devices 106. A search result 111 is data generated by the search system 110 that identifies a resource that is responsive to a particular search query, and includes a link to the resource. An example search result 111 can include a web page title, a snippet of text or a portion of an image extracted from the web page, and the URL of the web page. For example, the search queries 109 can be submitted during user sessions in which a user of a user device 106 enters search queries into a user interface. During a user session, the user can be presented with search results 111.

Search results are ranked based on scores related to the resources identified by the search results, such as information retrieval ("IR") scores, and optionally a quality score of each resource relative to other resources. In some implementations, the IR scores are computed from dot products of a feature vector corresponding to a search query 109 and a feature vector corresponding to a resource, and the ranking of the search results is based on relevance scores that are a combination, e.g., sums, products, or other mathematical combinations, of the IR scores and quality scores. In some examples, the search results 111 can be ordered at least partially according to these relevance scores and provided to the user device according to the order.

The user devices 106 receive the search results, e.g., in the form of one or more web pages, and render the pages for presentation to users. In response to the user selecting a link in a search result at a user device 106, the user device 106 requests the resource identified by the link. The web site 104 hosting the resource receives the request for the resource 105 from the user device 106 and provides the resource to the requesting user device 106.

In some implementations, a search query 109 can include data for a single query type or for two or more query types, e.g., types of data in the query. For example, the search query 109 may have a text portion, and the search query may also have an image portion. A search query 109 that includes data for two or more query types can be referred to as a "hybrid query." In some examples, a search query 109 includes data for only one type of query. For example, the search query 109 may only include image query data, e.g., a query image, or the search query may only include textual query data, e.g., a text query.

In some implementations, the search system 110 includes an image search apparatus 120 that is used to process queries to identify images that are responsive to the search query 109, e.g., semantically related to the search query 109. For example, a search query 109 may include text with which the search system 110 can perform an image search, e.g., a search for images that are responsive to the text.

The term "semantic relatedness" refers to the relatedness between text and images. A portion of text and an image are semantically related if the text describes a topic of an image or otherwise has a relationship with the content of the image. Generally, text is semantically related to an image if the text is similar to or relevant to a topic of the image. For example, the text "fish" is semantically related to an image of a mackerel. The degree to which text is semantically related can be quantified. For example, a confidence score may use used to indicate the degree to which text is accurately related to an image.

In some implementations, the search system 110 also includes a text search apparatus 130 that is used to perform a search based on a text query, e.g., text submitted by the user devices 106 as a portion of a query 109. The text search apparatus 130 can also perform a search based on a label for an image that was submitted by a user device 106 as a portion of a query 109, e.g., all or a proper subset of a query 109. For example, as described below, the label could be a label associated with the image by an image label apparatus 126. In some examples, the label is indexed according to and/or stored with a reference to the image.

An image label ("label") is data that is indicative of subject matter to which an image is relevant. Labels can be explicitly specified by a publisher of a web site 104 on which the image appears. Labels can also be generated, for example, based on text that appears near the image on the web page. For example, a label can be generated for an image based on text that is located adjacent to, e.g., within a threshold number of pixels of, the image or in a portion of a document that is identified as containing information relevant to the image, e.g., a frame in which the image is presented. A label can also be generated based on text that is included in the image, e.g., visually depicted in the image, or otherwise associated with the image, e.g., text included in a file name, text included in anchor text of a link to the image, or resource location of the image. The image label apparatus 126 can generate labels for images.

The queries submitted during the user sessions can be stored in query logs 114. Selection data defining actions taken responsive to search results provided for the user sessions can be stored in click logs 116. These actions can include whether a search result was selected, e.g., whether a user interacted with the search result. The query logs 114 and click logs 116 can be used to map queries submitted during user sessions to resources that were identified in search results and the actions taken by users. If time data are also stored, then the relative times at which those actions were taken can also be determined. The click logs and query logs can be used to map queries submitted during user sessions to resources that were identified in response to the queries and that were selected by the users of the user devices 106. In some implementations, the data stored in the query logs 114 and click logs 116 can be anonymized.

In some implementations, query data and image selection data, e.g., click data, are stored in the query logs 114 and click logs 116 for each unique query submitted by users. The query data are data that define queries of one or more words that were received, for example, as search queries 109. For example, if the queries "dolphin", "exhibits", and "dolphin exhibits" are each received by the search system 110, then query data and click data are stored in the query logs 114 and click logs 116 for each of the queries "dolphin", "exhibits", and "dolphin exhibits".

In some examples, the query logs 114 and click logs 116 can be used to generate image relevance models 112. Because the image search apparatus 120 processes each search query as a whole, it can create a corresponding image relevance model 112 for each query. When selecting images for reference in image search results responsive to a particular query, the image search apparatus 120 calculates the relevance measures based on an image relevance model 112 that is associated with that particular query.

Before the image relevance models 112 are used, they are generally trained by the image search apparatus 120. At a high level, the image search apparatus 120 can train an image relevance model 112 for each query by first selecting training images 118 that are relevant to that query. In some implementations, content feature values, i.e., values indicative of visual features of the image and/or other image features, for each training image are extracted and are transformed into a sparse representation using a pre-computed dictionary of visual terms that represent a set of regions having similar content feature values. The extraction and transformation yields a "bag of features" for the image. Generally, the content feature values of an image quantitatively represent visual features of the image.

Thereafter, an image relevance model 112 for each query is learned. The image relevance model 112 can be of the form that generates a score for an image based on the sparse representation of the image, e.g., $$IRS = W*X$$

where IRS is an image relevance score, X is a vector of feature values representing an image, and W is a vector of parameters, e.g., feature weights, learned for the model. In some implementations, the vector of feature values is a sparse vector of feature values representing an input image. In some implementations, the vector of feature values representing an input image is stored in a compressed form called an image content descriptor. The feature values can be determined by decompressing the image content descriptor into a vector of feature values.

The technique described here only represents some implementations for determining content feature values. Other implementations can use other techniques to determine content feature values. For example, some implementations can use a non-linear model for associating content feature values and feature weights.

To select training images 118, the image search apparatus 120 identifies images as being relevant to a query based on a relevance measure between the image and the query. In some implementations, the relevance measure is based on a relevance feedback score. The relevance feedback score is a relevance measure that is generated based on user actions in response to an image appearing in search results. For example, click data specifying a number of times an image was selected from search results for a query can represent a measure of the relevance of the image to the query. Thus, the image search apparatus 120 can derive the relevance measure, based at least in part on, the click logs 116 and query logs 114, e.g., based on numbers of times that images were presented in response to particular queries and numbers of times that users interacted with the images when presented.

Each image relevance model 112 is trained to determine the relevance of an image to a query, e.g., one of the queries 109, based on content feature values of images for which a relevance feedback score is available. In turn, the image relevance model can be applied to content feature values of other images to determine a relevance score for the other images relative to the query. For example, the content feature values can be input to the image relevance model, which can compute and output the relevance score.

The image search apparatus 120 applies an independent image relevance model 112 to content feature values of the images for each unique query, e.g., unique set of terms submitted as a query, that is identified by the image search apparatus 120. Using a separate image relevance model 112 for each query rather than using an image relevance model for each constituent term in the query reduces the overhead associated with identifying search results for a query. For example, the image relevance models 112 for the queries can be trained independently and in parallel, as they are not required to consider the output of other image relevance models 112 for other queries. Additionally, only one image relevance model 112 need be processed for each query, which reduces resources when selecting images to reference in image search results for a query.

When the image relevance model 112 receives an image as input, the image relevance model 112 can output a relevance score indicating the degree to which the input image is related to the query represented by the image relevance model 112. The reliability of the relevance score as an indication of image relevance to a particular query is generally dependent on the accuracy of relevance feedback as a relevance indicator.

The image search apparatus 120 includes an image similarity apparatus 124 and an image label apparatus 126. The image similarity apparatus 124 generates data indicative of the visual similarity of images to a query image. The image label apparatus 126 generates labels, e.g., textual data, indicative of a topic or subject matter to which a query image is related, or are otherwise semantically related to a query image.

The description that follows describes the image similarity apparatus 124, image label apparatus 126, as well as processes that can be implemented by these and other apparatus. These apparatus and related processes are described with reference to a search query that includes search queries 109 and search results 111 that have been identified as responsive to the search query. However, each respective apparatus and process can be implemented with different processing systems and for different operational environments.

The image similarity apparatus 124 includes one or more processors configured to identify images that are near duplicate images to an image received by the image similarity apparatus 124 as input. In some implementations, near duplicate images are images that are identical except for differences in the way the images have been processed. In general, the differences between two near duplicate images are differences other than differences in visual features of the images. As one example, two identical images at different resolutions are near duplicate images. As another example, two images of the same object having different brightness, contrast, or other image attributes, e.g., image attributes adjusted in image processing software, can be near duplicate images. As another example, an uncropped version of an image and a cropped version of the same image, e.g., cropped to remove a border in the image, can be near duplicate images. Images can be identified as near duplicate images if they satisfy a similarity threshold, e.g., a similar score determined by the image similarity apparatus 124 that exceeds a similarity threshold.

The image label apparatus 126 can receive an image as input and the image label apparatus 126 can return one or more labels that describe a topic of or are otherwise semantically related to the image. In some examples, the image label apparatus 126 can identify a label that is semantically related to an image because the image label apparatus 126 already stores data describing the image, including data indicating which labels are semantically related to the image. In some examples, the image label apparatus 126 can consult an image relevance model 112 to identify a label based on visual features of the image. For example, the image label apparatus 126 can provide the image to an image relevance model 112 for a particular query to determine the degree to which the image is relevant to the query. The query can then be used as a label for the image if the image is sufficiently relevant to the query.

Image labels can also be used to identify images that are responsive to a query. For example, the image relevance model 112 for the query can indicate whether a particular image is relevant to the query corresponding to the image relevance model. One way the image relevance model 112 can indicate the relevance of an image to a query corresponding to the image relevance model is to provide an image relevance score for the image.

Figure 2:
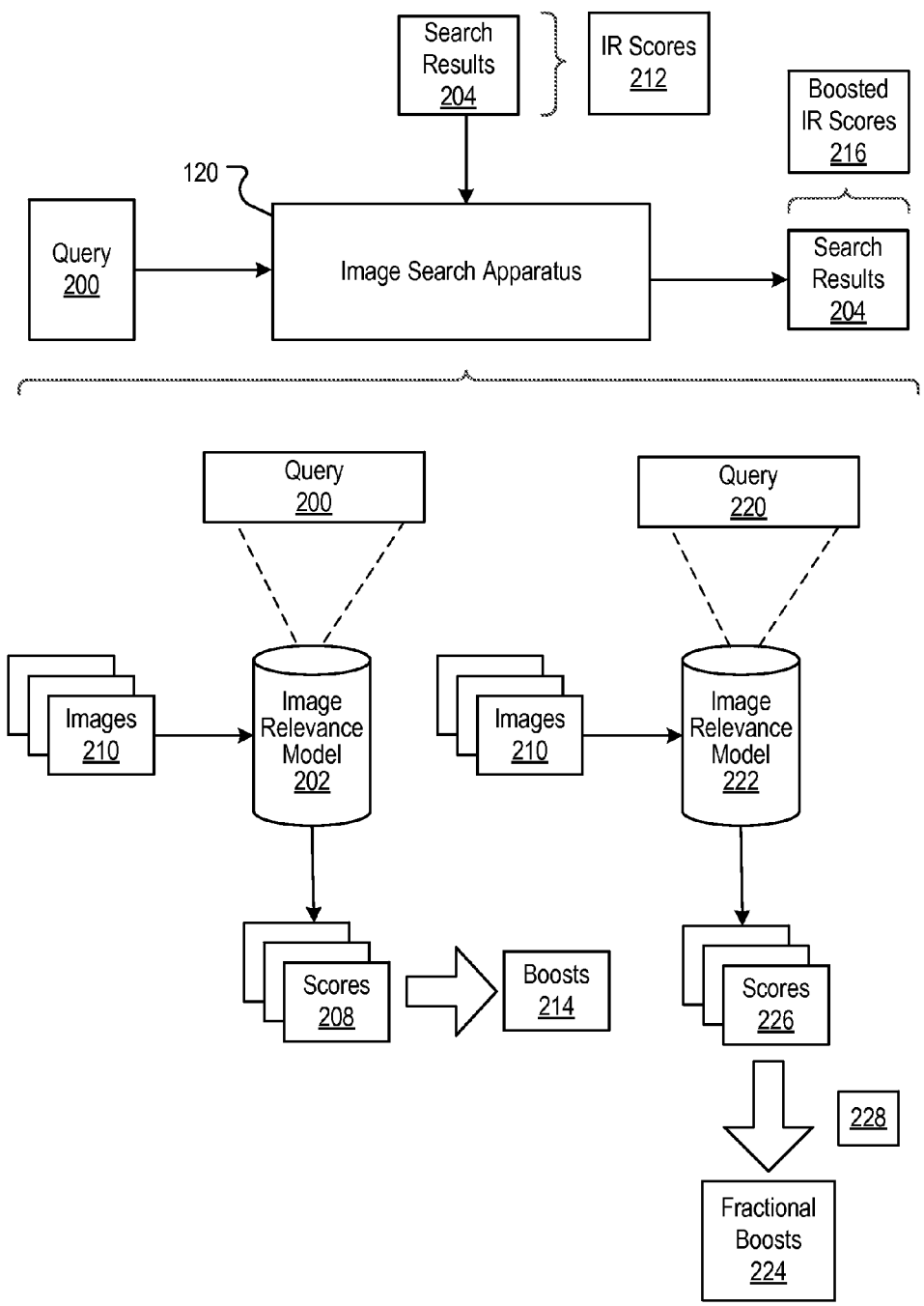
FIG. 2 is a block diagram illustrating the use of an image relevance model to determine the relevance of images to a query.

FIG. 2 is a block diagram illustrating the use of an image relevance model 202 to determine the relevance of images to a query. An image search apparatus 120 can use information about the relevance of an image to a query to apply a "boost" to an information retrieval (IR) score associated with the image when the image appears in search results 204.

The image search apparatus 120 receives a query 200, for example, a textual search query, and also receives search results 204 responsive to the query 200. The search results 204 may include references to resources such as images, web pages, and other kinds of resources. Each of the search results 204 is associated with an IR score 212—or another relevance score—indicating the relevance of each search result to the query 200. For example, a first resource referenced by the search results 204 may have a higher IR score than a second resource referenced by the search results 204, indicating that the first resource may be more relevant to the query 200 than the second resource.

If the resources referenced by the search results 204 include images 210, the image search apparatus 120 can apply an image relevance model 202 associated with the query 200 to the images 210. In some examples, some or all of the images 210 may be images contained in web pages referenced by the search results 204. In some examples, some or all of the images 210 are themselves referenced by the search results 204. An image 210 can be said to be associated with a search result 204 if the image 210 is referenced by the search result 204 or the image 210 is referenced by a resource referenced by the search result 204. The image relevance model 202 for the query 200 outputs an image relevance score 208 for each of the images 210. The image relevance score 208 indicates the degree to which a respective image 210 is relevant to the query 200.

The image relevance scores 208 can be used to generate a boost value 214 to be applied to each of the search results 204. In some implementations, the boost value 214 can be a multiplier for the IR score 212 that is associated with each of the respective search results 204. For example, the boost value 214 could be a multiplier, such that an IR score 212 for a particular search result 204 is halved or doubled or tripled or quadrupled or multiplied by some other value, based on the image relevance score 208 returned for the image 210 associated with the search result 204. In some implementations, the boost value 214 may be proportional to the image relevance score 208 for an image 210. For example, a boost value 214 could be one tenth of an image relevance score 209, such that if an image relevance score 208 of an image 210 is forty, then the boost value 214 may be a multiplier of four, and if an image relevance score 208 of an image 210 is twenty, then the boost value 214 may be a multiplier of two. In some implementations, the boost value 214 is determined according to a threshold value. For example, if the image relevance score 208 exceeds a certain threshold value, then a boost value 214 corresponding to the threshold is applied.

Once the boost values 214 are calculated for the images 210, the image search apparatus 120 applies the boost values 214 to the IR scores 212 for the search results 204 and outputs the search results 204 with the new boosted IR scores 216. The boosted IR scores 216 may be a replacement for the original IR scores 212, for example, or the boosted IR scores 216 may be a supplement to the original IR scores 212.

In some implementations, the image search apparatus 120 can calculate boost values based on a query other than the query 200 to which the search results 204 are responsive. For example, if an image relevance model 222 for a second query 220 similar to the first query 200 is available, the image relevance model 222 could also be used to determine boost values 224 to be applied to the IR scores 212 of the search results 204.

Two queries are similar if they share some, but not all, attributes in common with each other. In some examples, the attributes are the characters and/or words of the queries and the order in which the characters and/or words appear. The image relevance scores produced by an image relevance model for one query may be applicable to another query depending on a degree of similarity between the two queries.

If the image search apparatus 120 has identified the second query 220 as similar to the first query 200, the image search apparatus 120 can apply the image relevance model 222 for the second query 220 to the images 210 associated with the search results 204 responsive to the first query 200. The image relevance model 222 outputs image relevance scores 226 indicating the degree of relevance of the images 210 to the second query 220. The image search apparatus 120 can then produce boost values based on the image relevance scores 226. Further, the image search apparatus 120 can take into account the degree of similarity between the first query 200 and the second query 220 when determining the boost values. In some implementations, the image search apparatus 120 can calculate a fractional boost value 224 such that the boost value is reduced based on the degree of similarity between the first query 200 and the second query 220.

The degree of similarity between a first query 200 and a second query 220 can be determined according to one or more metrics of similarity. In examples in which the first query 200 and the second query 220 are text queries, the text of each query can be compared to evaluate the similarity of the queries.

In some examples, the queries 200, 220 differ in words that have been designated as having no semantic significance in a search query, sometimes referred to as "stop words." For example, stop words can be words such as articles and prepositions that have grammatical meaning but low semantic meaning relative to the semantic meaning of other types of words. Some stop words may be "the," "a," of," and "in." The presence of stop words can be an indication of similarity in queries that share words in common other than the stop words.

In some examples, the queries 200, 220 differ in one or more words that are variants of each other. For example, words that have a similar semantic meaning such as synonyms can be variants of each other, or words that are more specific versions of other words can be variants of each other. Words that are variants of each other could be, for example, "building" and "tower," or "large" and "big." The presence of variants can be used to determine a similarity metric for two queries.

In some examples, the queries 200, 220 differ in words that have been designated as being optional. For example, words that have semantic meaning but are generally not applicable to search queries may be designated as optional. Words designated as optional may include adjectives or adverbs, for example, qualifying words such as "good" or "great" or "awesome." The presence of words designated as optional can be an indication of similarity.

In some examples, the queries 200, 220 differ in the order of words. For example, the queries 200, 220 may share words in common but the words appear in a different order in the queries 200, 220. One query 200 could contain the words "morning sunrise" and another query 220 could contain the words "sunrise morning." The order of the words can be an indication of similarity. For example, if the words of two queries are in the same order, the order may be used as a positive indication of similarity. However, if the order of words differs between queries, the order may indicate dissimilarity of the queries.

In some examples, the queries 200, 220 share some words in common, but not all. For example, one of the queries 200 may have additional words not present in the other query 220. Further, in some examples, the other query 220 may also have additional words not present in the first query 200. The presence of additional words can be factored into a measure of similarity of the two queries. For example, the presence of additional words may indicate dissimilarity of the queries.

These metrics of similarity can be used to determine the degree of similarity between the queries. In some implementations, some metrics of similarity are weighted differently than others in determining the degree of similarity. For example, queries that differ only in stop words may be determined by the image search apparatus 120 as more similar than queries that have one or more words not in common with each other or one or more words that are variants of each other.

If the image search apparatus 120 applies the image relevance model 222 of the second query 220 after identifying the second query 220 as similar to the first query 200, the image search apparatus 120 can use the image relevance scores 226 provided by the image relevance model 222 to calculate fractional boost values 224. The fractional boost values 224 can be determined based on the degree of similarity between the first query 200 and the second query 220.

In some examples, when applying an image relevance model 222 for the second query 220 to images 210 associated with the first query 200, the image search apparatus 120 calculates the fractional boost values 224 from the image relevance scores 226 in a manner similar to that by which it calculates boost values 214 for image relevance scores 208 provided by an image relevance model 202 corresponding to the first query 200. Then, after calculating the boost values, the image search apparatus 120 reduces the boost values by a fractional amount, for example, based on the similarity between the second query 220 and the first query 200.

For example, the image search apparatus 120 might calculate boost values by reducing image relevance scores by one half. In this way, the image search apparatus 120 might receive an image relevance score for a particular image of forty. To calculate the boost value, the image search apparatus 120 can reduce the score by one-half, to twenty. To calculate a fractional boost value, the image search apparatus 120 may apply a divisor 228 to the boost value. For example, based on the degree of similarity between the query received by the image search apparatus 120 and the query corresponding to the image relevance model, the divisor 228 may be two. Thus, the image search apparatus would divide the boost value of twenty by two, to generate a fractional boost value of ten.

In some implementations, when the similarity of the query 200 received by the image search apparatus 120 to the query 220 corresponding to the image relevance model 222 is larger, the fractional boost values 224 will be larger. When the similarity of the query 200 received by the image search apparatus 120 to the query 220 corresponding to the image relevance model 222 is smaller, the fractional boost values 224 will be smaller. The image search apparatus 120 determines how to correlate the degree of similarity between queries and the fractional boost values. In some implementations, the image search apparatus 120 assigns metrics of similarity to divisors used to calculate fractional boost values.

For example, if the query 200 received by the image search apparatus 120 differs from the query 220 corresponding to the image relevance model 222 only by the presence of stop words in one query, the image search apparatus 120 may apply a divisor 228 of 1 to calculated boost values to generate fractional boost values. Put another way, queries that differ only in stop words may have a degree of similarity high enough that boost values generated based on an image relevance model corresponding to one query need not be reduced when applying the image relevance model to search results responsive to the other query.

As another example, if the query 200 received by the image search apparatus 120 differs from the query 220 corresponding to the image relevance model 222 by the presence of words that are variants of each other in each query, the image search apparatus 120 may apply a divisor 228 of two to calculated boost values to generate fractional boost values.

Put another way, queries that use variants of the same word may have a degree of similarity such that the boost values generated based on an image relevance model corresponding to one query should be reduced by half when applying the image relevance model to search results responsive to the other query. Because two queries may differ based on multiple metrics of similarity, the image search apparatus 120 can use one or more algorithms to determine a divisor 228 that should be applied to boost values to generate fractional boost values.

In some implementations, divisors 228 can be pre-selected to correspond to a measure of similarity or a combination of measures of similarity. For example, the image search apparatus 120 may store a static list of divisors and measures of similarity to which each divisor corresponds. In this example, a divisor 228 can be chosen by identifying a divisor that corresponds to a particular measure of similarity or combination of measures of similarity. In this way, the divisor 228 is chosen based on similarities and dissimilarities exhibited between the query 200 received by the image search apparatus 120 and the query 220 corresponding to the image relevance model 222. For example, if the two queries 200, 220 differ by the presence of words that are variants of each other in each query, a divisor 228 of two can be chosen. If the two queries 200, 220 differ by the presence of words that are variants of each other in each query, and also differ by the presence of optional words in one query 200, 220, then a divisor 228 of three can be chosen. If the two queries 200, 220 differ by the order of words in the two queries, a divisor 228 of four can be chosen. If the two queries 200, 220 differ by the presence of additional words in one query, a divisor 228 of five can be chosen. If the two queries 200, 220 differ by the presence of additional words in one query, as well the presence of words that are variants of each other in each query, a divisor 228 of six can be chosen. If the two queries 200, 220 differ by the presence of additional words in one query, as well as differing by the order of words in the query, a divisor 228 of seven can be chosen. In this way, the more dissimilar the queries 200, 220, the greater the divisor will be used. The examples described here are just some examples of divisors that can correspond to measures of similarity. Other values can be used for the divisor 228 besides the examples listed here.

Additionally, or alternatively, the divisors can be determined based on the measure of similarity between two queries. For example, the divisor can be inversely proportional to the measure of similarity, such that as the measure of similarity increases, the divisor decreases.

Once fractional boost values 224 are calculated, e.g., using the divisors, the image search apparatus 120 can apply the fractional boost values 224 to the IR scores 212 for the search results 204 and output the search results 204 with the new boosted IR scores 216, in a manner similar to the scenarios in which the image search apparatus applies non-fractional boost values 214.

Figure 3:
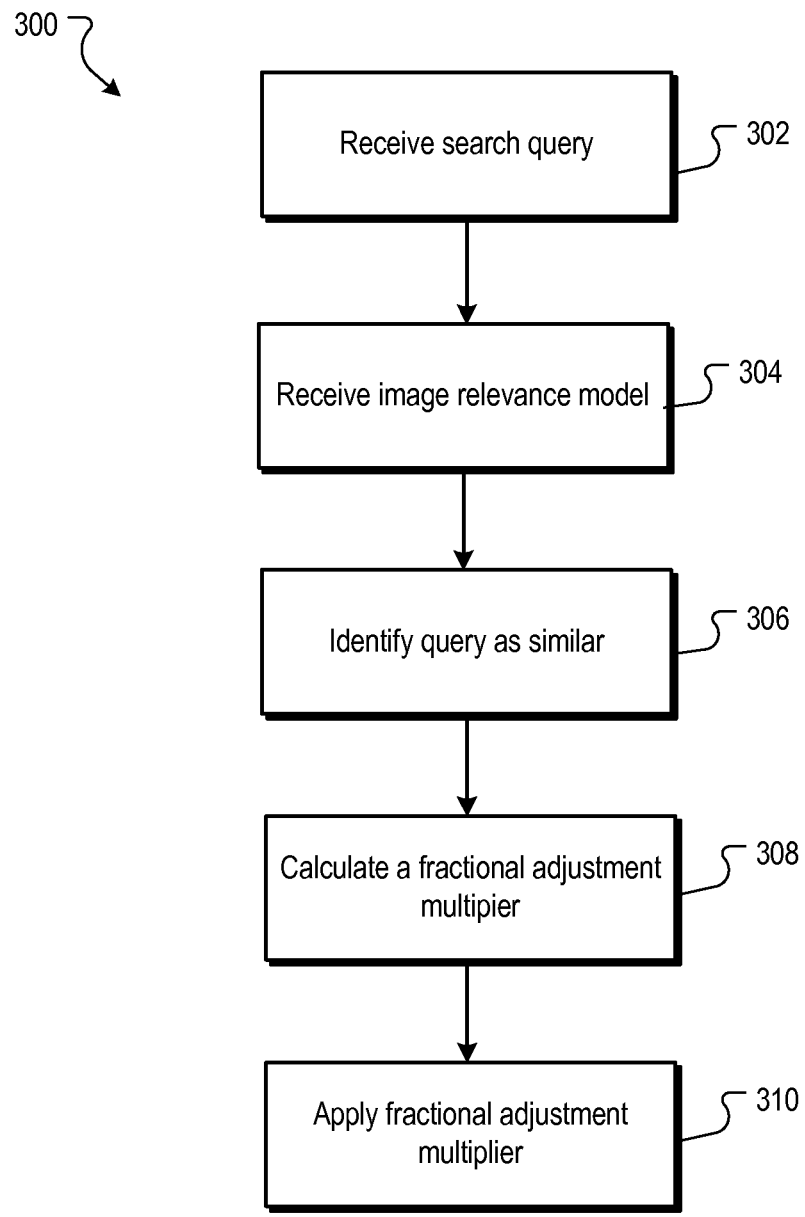
FIG. 3 is a flowchart of an example process for refining an image relevance model.

FIG. 3 is a flowchart of an example process 300 for refining an image relevance model. The operations of the process 300 can be performed, for example, by an image search apparatus 120.

At operation 302, a search query is received. The search query includes one or more query terms. For example, the search query can be a textual search query, and the query terms can include words.

At operation 304, image relevance models, e.g. image relevance models 112 shown in FIG. 1, are received. The image relevance models each generate relevance measures of content feature values of images to a query based on content feature values of a set of training images. Each image relevance model is trained based on a corresponding query, and the corresponding query is a unique set of one or more query terms received by a search system as a query input.

At operation 306, a query of one of the image relevance models is identified as similar to the received search query. For example, the query of the image relevance model may have some or all of its query terms in common with the received search query.

At operation 308, a fractional adjustment multiplier for search results responsive to the received search query is calculated. The fractional adjustment multiplier is based on a relevance measure generated by the image relevance model for the identified query and based on a degree of similarity between the received search query and the different query that has been identified as similar to the received search query. The relevance measure can be, for example, an image relevance score 226 (FIG. 2) generated by an image relevance model. In some examples, the degree of similarity between the query of the image relevance model and the received search query can be determined, for example, based on one or more similarity metrics. In some examples, the similarity metric can be a measure of similarity of query terms in the query of the image relevance model and query terms in the received search query. For example, the similarity metric may be a measure of query terms common to both queries, or a measure of similarity based on the order of the query terms, or a measure of similarity based on words in the queries being variants of one another, or based on another indication of similarity.

In some implementations, the fractional adjustment multiplier can be calculated by calculating an adjustment multiplier, such as a boost value, based on the relevance measure generated by the image relevance model. A divisor can then be applied to the adjustment multiplier, such that the divisor is determined based on the degree of similarity between the query of the image relevance model and the received search query. For example, the divisor can be chosen in the way that the divisor 228 shown in FIG. 2 is chosen. In some implementations, the relevance measure can be generated by applying the image relevance model for the identified query to a resource referenced by the search results responsive to the received search query.

At operation 310, the fractional adjustment multiplier is applied to an information retrieval score associated with a resource referenced by the search results responsive to the search query. In this way, the fractional adjustment multiplier can be used to "boost" a search result based on the degree to which a resource such as an image referenced by the search result is relevant to the query as determined by an image relevance model.

Figure 4:
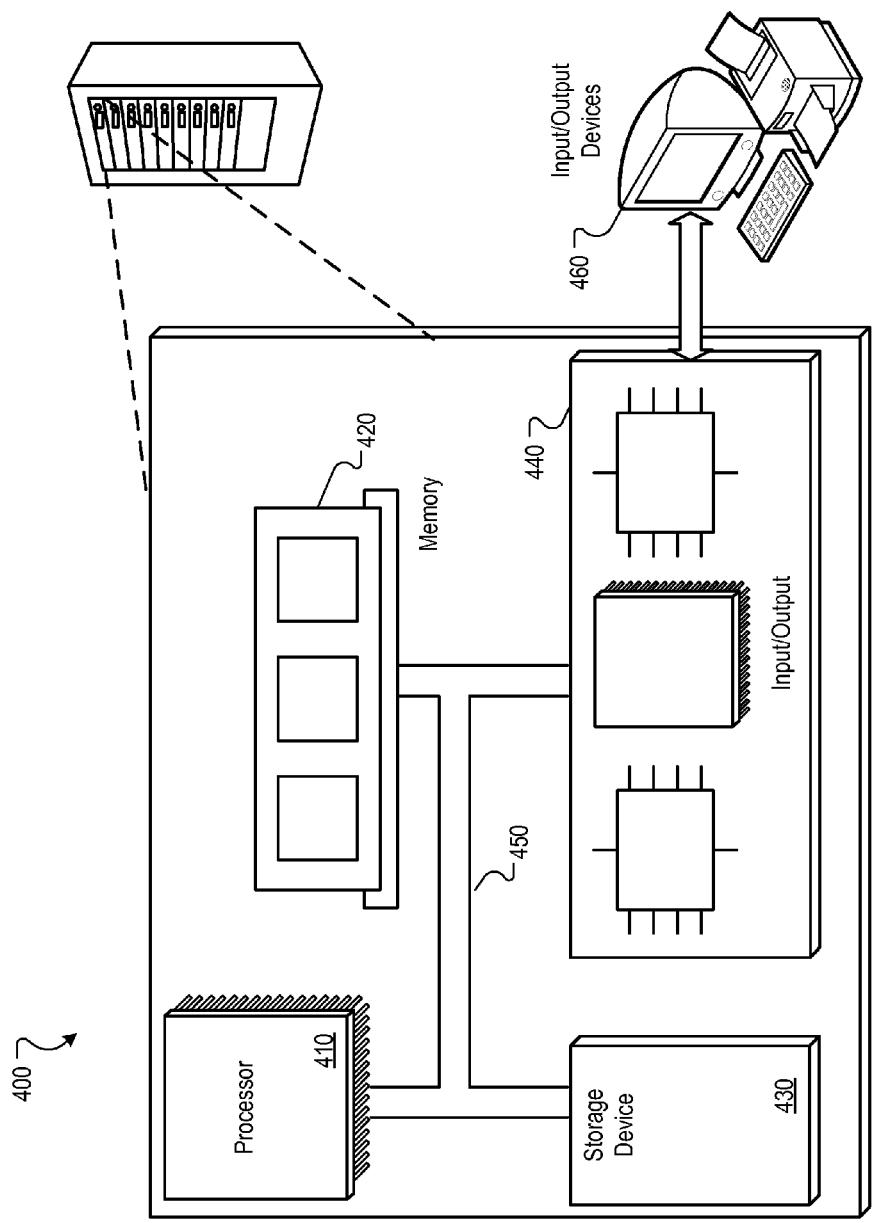
FIG. 4 is a block diagram of an example computer system.

FIG. 4 is a block diagram of an example computer system 400. For example, the system 400 could be a system or a portion of a system executing the search system 110 shown in FIG. 1. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving a search query comprising one or more query terms;
   identifying, based on the search query, a set of images that are responsive to the search query;
   identifying one or more image relevance models that output, based on visual features of images responsive to queries, relevance adjustment values for images identified as responsive to the search queries, each of the queries being a set of one or more query terms received by a search system as a query input, and each set of one or more query terms being different from each other set of one or more query terms;
   determining that an image relevance model for the received search query is not included in the one or more image relevance models;
   identifying, from the one or more image relevance models and in response to determining that the image relevance model for the received search query is not included in the one or more image relevance models, an image relevance model for a different query that has been identified as similar to the received search query, wherein the different query is different from the received search query; and
   determining, by one or more data processing apparatus, a degree of similarity between the search query and the different query based, at least in part, on a level of similarity between one or more words included in the search query and the different query;
   determining, for image search results responsive to the received search query that are evaluated using the image relevance model for the different query, a fractional adjustment value based on the degree of similarity between the different query and the received search query, wherein the fractional adjustment value for a higher degree of similarity is lower than the fractional adjustment value for a lower degree of similarity;
   obtaining, based on visual features of each image in the set of images responsive to the search query, an image relevance adjustment value for the image using the image relevance model for the different query;
   reducing, for each of the images in the set of images, the image relevance adjustment value based on the fractional adjustment value;
   determining, for each of one or more images in the set of images, a relevance score for the image relative to the received search query based, at least in part on the reduced image relevance adjustment value; and
   outputting, based on the relevance score for the image, image search results that identify the image as responsive to the search query.

2. The method of claim 1, comprising determining the degree of similarity between the different query of the identified image relevance model and the received search query based a similarity metric applicable to queries.

3. The method of claim 2, wherein the similarity metric comprises a measure of similarity of query terms in the received search query and query terms of the different query that has been identified as similar to the received search query.

4. The method of claim 1, wherein determining a fractional adjustment value comprises:
   determining an adjustment multiplier based on a relevance measure generated by the identified image relevance model; and
   applying a divisor to the adjustment multiplier, the divisor being determined based on the degree of similarity between the different query of the identified image relevance model and the received search query.

5. The method of claim 1, comprising applying the identified image relevance model for the different query to a resource referenced by the search results to generate a relevance measure.

6. The method of claim 1, comprising applying the fractional adjustment value to an information retrieval score associated with a resource referenced by the search results.

7. A system, comprising:
a data processing apparatus; and
a memory coupled to the data processing apparatus having instructions stored thereon which, when executed by the data processing apparatus cause the data processing apparatus to perform operations comprising:
receiving a search query comprising one or more query terms;
identifying, based on the search query, a set of images that are responsive to the search query;
identifying one or more image relevance models that output, based on visual features of images responsive to queries, relevance adjustment values for images identified as responsive to the search queries, each of the queries being a set of one or more query terms received by a search system as a query input, and each set of one or more query terms being different from each other set of one or more query terms;
determining that an image relevance model for the received search query is not included in the one or more image relevance models;
identifying, from the one or more image relevance models and in response to determining that the image relevance model for the received search query is not included in the one or more image relevance models, an image relevance model for a different query that has been identified as similar to the received search query, wherein the different query is different from the received search query; and
determining a degree of similarity between the search query and the different query based, at least in part, on a level of similarity between one or more words included in the search query and the different query;
determining, for image search results responsive to the received search query, that are evaluated using the image relevance model for the different query, a fractional adjustment value based on the degree of similarity between the different query and the received search query, wherein the fractional adjustment value for a higher degree of similarity is lower than the fractional adjustment value for a lower degree of similarity;
obtaining, based on visual features of each image in the set of images responsive to the search query, an image relevance adjustment value for the image using the image relevance model for the different query;
reducing, for each of the images in the set of images, the image relevance adjustment value based on the fractional adjustment value;
determining, for each of one or more images in the set of images, a relevance score for the image relative to the received search query based, at least in part on the reduced image relevance adjustment value; and
outputting, based on the relevance score for the image, image search results that identify the image as responsive to the search query.

8. The system of claim 7, the operations comprising determining the degree of similarity between the different query of the identified image relevance model and the received search query based a similarity metric applicable to queries.

9. The system of claim 8, wherein the similarity metric comprises a measure of similarity of query terms in the received search query and query terms of the different query that has been identified as similar to the received search query.

10. The system of claim 7, wherein determining a fractional adjustment value comprises:
determining an adjustment multiplier based on a relevance measure generated by the identified image relevance model; and
applying a divisor to the adjustment multiplier, the divisor being determined based on the degree of similarity between the different query of the identified image relevance model and the received search query.

11. The system of claim 7, the operations comprising applying the identified image relevance model for the different query to a resource referenced by the search results to generate a relevance measure.

12. The system of claim 7, the operations comprising applying the fractional adjustment value to an information retrieval score associated with a resource referenced by the search results.

13. A non-transitory computer readable media storing software comprising instructions executable by a processing device and upon such execution cause the processing device to perform operations comprising:
receiving a search query comprising one or more query terms;
identifying, based on the search query, a set of images that are responsive to the search query;
identifying one or more image relevance models that output, based on visual features of images responsive to queries, relevance adjustment values for images identified as responsive to the search queries, each of the queries being a set of one or more query terms received by a search system as a query input, and each set of one or more query terms being different from each other set of one or more query terms;
determining that an image relevance model for the received search query is not included in the one or more image relevance models;
identifying, from the one or more image relevance models and in response to determining that the image relevance model for the received search query is not included in the one or more image relevance models, an image relevance model for a different query that has been identified as similar to the received search query, wherein the different query is different from the received search query; and
determining a degree of similarity between the search query and the different query based, at least in part, on a level of similarity between one or more words included in the search query and the different query;
determining, for image search results responsive to the received search query that are evaluated using the image relevance model for the different query, a fractional adjustment value based on the degree of similarity between the different query and the received search query, wherein the fractional adjustment value for a higher degree of similarity is lower than the fractional adjustment value for a lower degree of similarity;
obtaining, based on visual features of each image in the set of images responsive to the search query, an image relevance adjustment value for the image using the image relevance model for the different query;

reducing, for each of the images in the set of images, the image relevance adjustment value based on the fractional adjustment value;

determining, for each of one or more images in the set of images, a relevance score for the image relative to the received search query based, at least in part on the reduced image relevance adjustment value; and outputting, based on the relevance score for the image, image search results that identify the image as responsive to the search query.

14. The computer readable media of claim 13, the operations comprising determining a degree of similarity between the different query of the identified image relevance model and the received search query based a similarity metric applicable to queries.

15. The computer readable media of claim 14, wherein the similarity metric comprises a measure of similarity of query terms in the received search query and query terms of the different query that has been identified as similar to the received search query.

16. The computer readable media of claim 13, wherein determining a fractional adjustment value comprises:

determining an adjustment multiplier based on a relevance measure generated by the identified image relevance model; and applying a divisor to the adjustment multiplier, the divisor being determined based on the degree of similarity between the different query of the identified image relevance model and the received search query.

17. The computer readable media of claim 13, the operations comprising applying the identified image relevance model for the different query to a resource referenced by the search results to generate a relevance measure.

18. The computer readable media of claim 13, the operations comprising applying the fractional adjustment value to an information retrieval score associated with a resource referenced by the search results.

* * * * *